Jan. 21, 1941.　　　　F. SZALAY　　　　2,229,197
CURRENT COLLECTOR FOR TROLLEY BUSSES OR LIKE VEHICLES
Filed June 30, 1939
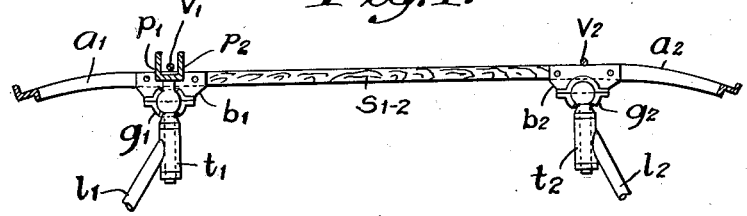
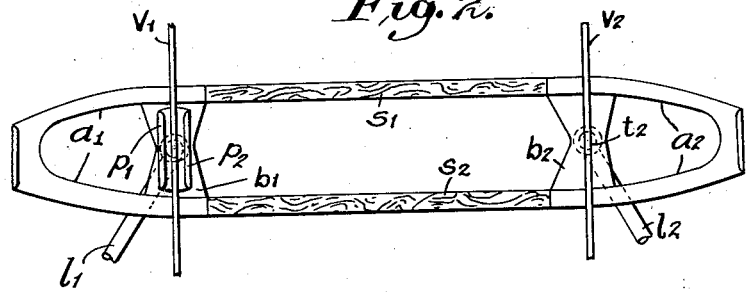
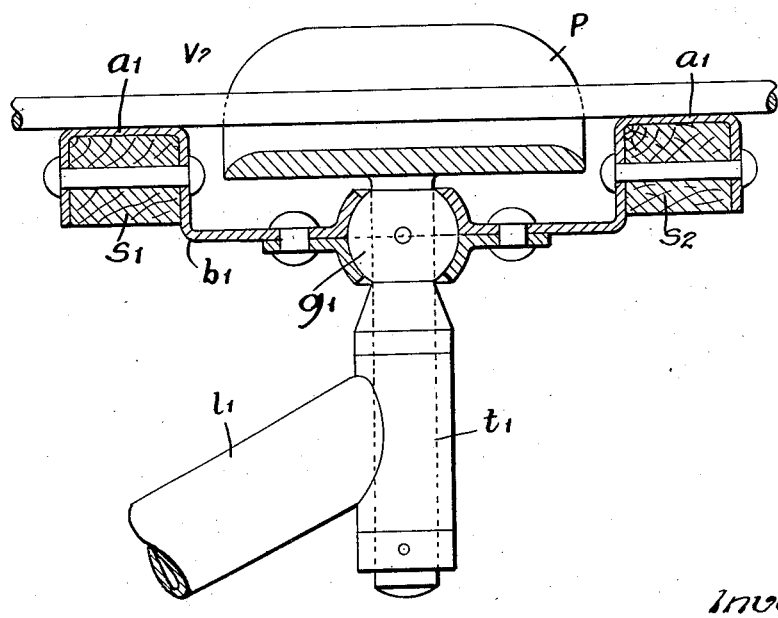
Inventor:
F. Szalay
By E. F. Wendroth
Attorney.

Patented Jan. 21, 1941

2,229,197

UNITED STATES PATENT OFFICE 2,229,197

CURRENT COLLECTOR FOR TROLLEY BUSSES OR LIKE VEHICLES

Ferenc Szalay, Budapest, Hungary, assignor to the firm Inventio Patentverwertungs-Aktiengesellschaft, Glarus, Switzerland, a company of Switzerland Application June 30, 1939, Serial No. 282,312
In Hungary July 2, 1938

4 Claims. (Cl. 191—55)

The invention comprises improvements in or relating to current collectors for trolley busses or like vehicles supplied from two or more overhead wires.

The invention relates to current collecting assemblies for the kind comprising a double trolley pole and two or more collecting members (i. e. shoes or wheels) appropriated to the several overhead wires respectively and supported in electrically insulated spaced relationship from the trolley pole by means allowing rotational movement of the collecting members in relation to the pole to adapt themselves to the overhead wires.

The invention enables the use of a current collector assembly of the above kind even for such trolley wires which are mounted for two double-flanged current collectors operating independently from each other, that is where the mutual distance of the two trolley wires is variable.

For this purpose the lateral deviation of the contacts, the positions of which are determined by the two current collector poles of the vehicle and by the electrically insulated pivotal connection of the same is prevented by limiters arranged only on both sides of one trolley wire in order to enable them to pass over the junctions or crossovers mounted for double-flanged sliding contacts.

If the longitudinal measure of the limiters makes it necessary, they are made adjustable on a common axis, arranged vertically to the plane of the contacts, in order to prevent that the current collector which adjusts itself together with the vehicle in an oblique position to the trolley wire, becomes wedged in.

One advantage of the present invention, when compared with two double-flanged current collectors moving independently from each other, consists in that at junctions and cross-overs only one trolley wire has to be provided with expensive fittings.

An embodiment of the invention will now be described, by way of example, with reference to the accompanying drawing in which Figure 1 is a front-view of the double-pole current collector provided with guiding flanges (limiters) for one trolley wire, Fig. 2 is a top-view and Fig. 3 is a side-view partly in cross-section of the double-pole current collector represented in Fig. 1.

With reference to the drawing, the current collecting shoes $a_1$, $a_2$ are connected by the insulating rods $s_1$, $s_2$. Between the contact surfaces of the collecting shoes $a_1$, $a_2$ the flanges $p_1$, $p_2$ are pivotally arranged around the axis $t_1$ on the end of the pole $l_1$. The intermediate member $b_1$ which interconnects the contact surfaces of the sliding contact $a_1$ is pivoted in a universal joint $g_1$ arranged centrically to the axis $t_1$, whereby the adjustment of the shoe $a_1$ to the trolley wire is secured within certain limits. The shoe $a_2$ is pivoted in the universal joint $g_2$ of the axis $t_2$. Here, however, the flanges $p_1$, $p_2$ limiting the lateral deviation are omitted. They can be, however, arranged below any trolley-wire, and if a third trolley-wire is mounted also even below this. The shoes $a_1$, $a_2$ may be interconnected by insulating rods in such a manner as to be independently adjustable to the trolley wire around an axis, which is arranged vertically to the axes $t_1$, $t_2$.

What I claim is:

1. A current collecting trolley assembly for a vehicle, comprising a trolley pole, means carried at the free end of said pole and adapted for rotation about a substantially vertical axis, a universal joint on said means, collector-shoe-carrying means mounted on said universal joint, a slidable collecting shoe on said shoe carrying means, and fast thereto, and limiting means on the uppermost end of said first mentioned means and rotatable therewith, said limiting means loosely receiving a trolley wire and guiding said trolley assembly relative thereto, said collecting shoe also bearing against said trolley wire, contact of the collecting shoe with the trolley wire being assured substantially regardless of the position of the vehicle relative to the trolley wire.

2. A current collecting trolley assembly for a vehicle, comprising a trolley pole, means carried at the free end of said pole and adapted for rotation about a substantially vertical axis, a universal joint on said means, and a substantially channel shaped flanged device fast to the first-mentioned means adjacent to the upper end thereof and rotatable therewith, and adapted to receive a trolley-wire therein, the width and depth of the channel both being appreciably greater than the diameter of the trolley wire, so that the trolley wire is loosely received and somewhat restrained in said flanged device, said collecting shoe also bearing against said trolley wire, contact of the collecting shoe with the trolley wire being assured substantially regardless of the position of the vehicle relative to the trolley wire.

3. A current-collecting-trolley assembly for a vehicle, comprising two trolley poles extending upwardly from said vehicle independently from each other, means carried at the free end of each pole for rotation about a vertical axis, a universal joint on said means, a collector-shoe-carrying means adapted for rotation about said universal joint, a slidable collector shoe on each said carrying means, each collector shoe being adapted to bear against a corresponding trolley wire, insulating means interconnecting said collector shoes into a rigid frame work, and limiting means on the first-mentioned means of one trolley pole, near the upper end of said means, for loosely receiving, and for limiting the movement of said trolley wire and for guiding the entire trolley assembly relative thereto.

4. A current-collecting trolley assembly for a vehicle, comprising two trolley poles extending upwardly from said vehicle independently of each other, a collector-shoe-carrying means mounted one adjacent the end of each said pole for substantially universal movement relative thereto, a slidable collector shoe on each said carrying means, each collector shoe being adapted to bear against a corresponding trolley wire, insulating means interconnecting said collector shoes into a rigid framework, and limiting means on one said trolley pole near the free end of the latter for rotation about an approximately vertical axis, and adapted to receive loosely and to limit the movement of the trolley wire corresponding thereto, and for guiding the entire trolley assembly relative thereto.

FERENC SZALAY.